Aug. 28, 1923.
J. T. CRANE
PACKING
Filed May 15, 1920
1,466,641
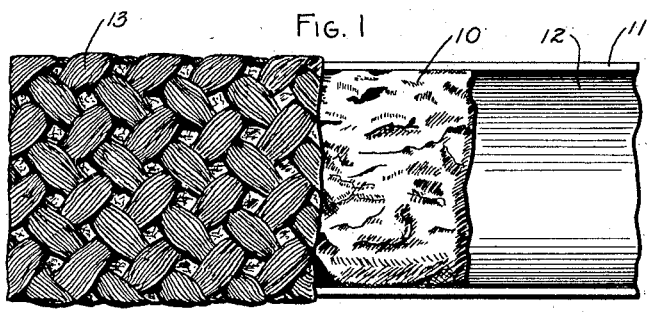
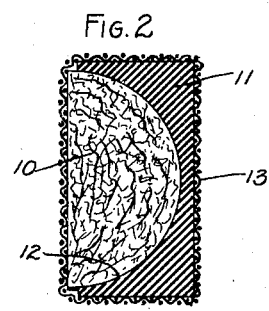
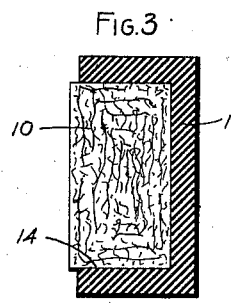
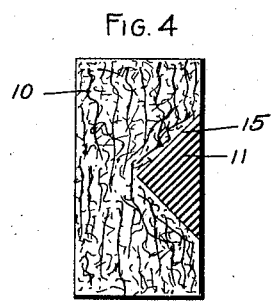
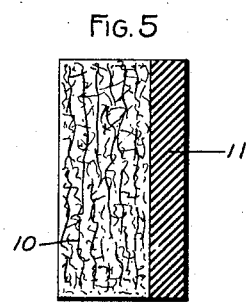
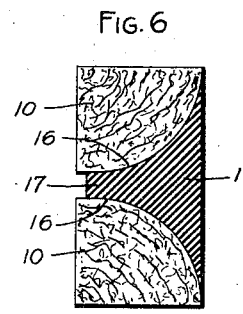
INVENTOR
JOHN T. CRANE
BY Benjamin, Roodhouse & Lundy.
ATTYS.

Patented Aug. 28, 1923.

1,466,641

UNITED STATES PATENT OFFICE.

JOHN T. CRANE, OF MAYWOOD, ILLINOIS, ASSIGNOR TO CHICAGO METALLIC PACKING CO., OF CHICAGO, ILLINOIS, A CORPORATION OF ILLINOIS.

PACKING.

Application filed May 15, 1920. Serial No. 381,638.

*To all whom it may concern:*

Be it known that I, JOHN T. CRANE, a citizen of the United States residing at Maywood, in the county of Cook and State of Illinois, have invented a new and useful Improvement in Packings, of which the following is a specification.

My present invention relates to improvements in packing and has special reference to the provision of a packing which will be peculiarly suitable for use with piston rods which are out of line, or which have been worn to such an extent as to have developed a shoulder or shoulders, or which are subject to vibration.

The packing described in United States Letters Patent No. 1,316,772, issued to me September 23, 1919, is flexible, and, so far as I know, is of such a nature as to accommodate itself to the surface of a piston rod or other moving surface, and so long as the moving surface contacts therewith forms a perfect packing therefor. But, in the instances mentioned above in which the rod surface is liable to retire from contact with the packing an element must be employed which will keep the packing yielding in contact with the rod. I am aware that rubber and other resilient cores have been employed in packing for the purpose of securing elasticity in the resulting packing, but when such resilient material is located wholly within the body of the packing and surrounded with non-resilient compressible material the elasticity thereof is materially deadened and rendered ineffective.

My present invention consists in employing rubber or other suitable elastic material together with flexible metal, such as is shown and described in my above-mentioned Letters Patent, and disposing these respective elements so that the metal will be adjacent to and in contact with the moving surface, and the elastic element will be disposed between the flexible metal and the non-compressible wall of the packing chamber so as to continually and yieldingly press the metal towards the moving surface while at the same time the elastic material will be wholly protected by the metal from the friction with and abrasion by the moving surface, and will also be protected from the action of the vapors or fluids which may be brought into contact with the packing by the moving surface.

I prefer to attain the above mentioned objects by the design and arrangement of the elements as illustrated in the accompanying drawings forming a part of this specification, in which Figure 1 is an elevation of my improved packing, drawn to an enlarged scale.

Figure 2 is an end elevation or cross section of the structure shown in Figure 1.

Figures 3, 4, 5 and 6 are end elevations or cross sections showing different arrangements of the elastic and flexible metal elements with the exterior braiding removed.

In the drawings, I have employed the same reference characters to designate similar parts, and as before mentioned, and as can be more particularly seen by reference to my Patent No. 1,316,772, the metallic element 10 consists of metal foil either in the form of sheets or strips of any desired width which are preferably coated with oil and graphite, or other suitable lubricant, and crinkled together and given the desired cross-sectional form. In the preferred form, as shown in Figures 1 and 2 of the drawings, the elastic element 11 has a rectangular exterior sectional contour of a size slightly smaller than is desired for the completed packing one face of the elastic element being provided with a channel 12 of round or cylindrical section to receive the flexible metallic element 10 which is placed adjacent the moving surface to be packed. Around the elements thus disposed is braided a retaining fabric 13 to hold the elements in the arrangement described. The retaining fabric is braided preferably from bundles of soft fine or thread-like copper wires, as seen in detail in Figure 1 of the drawings. This containing fabric being formed of soft fine copper wire is easily and quickly compacted and does not absorb the elasticity of the elastic element to any appreciable extent. It will now be seen that elastic element 11, instead of being wholly surrounded by compressible but nonelastic substances as is the case when it is disposed in the center of packing, has the opportunity to press the flexible metallic element yieldingly towards the moving surface, and that its elastic quality is exerted wholly against the flexible metallic element, the backing of the elastic element being the non-compressible walls of the gland or packing chamber or stuffing box in which the packing is placed. It will also be seen that the flexible metallic element will protect the elastic surface and from the deteriorating action of such gases, vapors or liquids as may be carried into the packing chamber by the moving surface.

In Figure 3 the elastic element is provided with a rectangular channel 14 instead of the circular or cylindrical channel 12, as shown in Figure 2, and the flexible metallic element being shaped to fit this particular form of channel.

In Figure 4 the elastic element is likewise disposed on the rear face of the packing, but is given a triangular section, and the flexible metallic element is formed with a channel 15 to accommodate the elastic element.

In Figure 5 the elastic element is also disposed on the back of the packing and is given a rectangular section.

In Figure 6 the elastic element has a flat rear face the edges being concavely molded as at 16, 16, thereby extending the central portion 17 of the elastic element well into the body of the packing. In this modification, the flexible metallic element fills out the channels formed by the concave molding of the elastic element.

All of these forms have special desirable features for particular situations, but they are all similar in that the packing may be made continuous in any desired length; that it can be easily bent for insertion into a packing chamber of any curvature or diameter; that the full elasticity of the elastic element is realized for yieldingly pressing the metallic element against the moving surface; and that the elastic element is covered and protected by the metallic element.

The drawings are, in a sense, merely diagrammatic for the purpose of illustrations, and I have shown but a few modifications in which my improved packing may be fabricated. It will be obvious to others skilled in this art that divers other modifications may be made without materially departing from the principle I have disclosed. Therefore, I desire it understood that all such modifications or changes are contemplated within the scope of the appended claims.

What I claim is:—

1. A packing consisting of metal foil formed in suitable cross-sectional dimensions, a cushion of resilient material contiguous thereto, and a casing of braided material enclosing the same.

2. A packing consisting of metal foil formed in suitable cross-sectional dimensions, a rubber cushion contiguous thereto, and a casing of braided material enclosing the same.

3. A packing consisting of metal foil crinkled together and formed in suitable cross-sectional dimensions, a cushion of resilient material contiguous thereto, and a casing of braided material enclosing the same.

4. A packing consisting of metal foil crinkled together and formed in suitable cross-sectional dimensions, a rubber cushion contiguous thereto, and a casing of braided material enclosing the same.

5. A packing consisting of strips of metal foil coated with graphite and oil and crinkled together and pressed into desired form, a cushion of rubber contiguous thereto, and a casing therefor formed of braided bundles of copper wire.

6. A packing comprising a backing of rubber, and a facing of crinkled metal foil, the same being surrounded by a braiding of copper wire, whereby the metal is presented yieldingly to a moving surface.

Signed at Chicago, county of Cook and State of Illinois, this 13th day of May, 1920.

JOHN T. CRANE.

Witnesses:
E. K. LUNDY, Jr.,
FLORENCE MITCHELL.